(12) United States Patent
Schimitzek

(10) Patent No.: US 7,929,731 B2
(45) Date of Patent: Apr. 19, 2011

(54) DATA ACQUISITION FOR CLASSIFYING SLAUGHTERED ANIMAL BODIES AND FOR THEIR QUALITATIVE AND QUANTITATIVE DETERMINATION

(75) Inventor: Peter Schimitzek, Geilenkirchen (DE)

(73) Assignee: CSB-System AG, Geilenkirchen (DE)

( * ) Notice: Subject to any disclaimer, the term of this patent is extended or adjusted under 35 U.S.C. 154(b) by 957 days.

(21) Appl. No.: 11/574,142

(22) PCT Filed: Sep. 17, 2005

(86) PCT No.: PCT/DE2005/001637
§ 371 (c)(1),
(2), (4) Date: Feb. 23, 2007

(87) PCT Pub. No.: WO2006/053509
PCT Pub. Date: May 26, 2006

(65) Prior Publication Data
US 2008/0310684 A1    Dec. 18, 2008

(30) Foreign Application Priority Data

Nov. 17, 2004    (DE) .......................... 10 2004 055 351

(51) Int. Cl.
*G06K 9/00* (2006.01)
*A22C 18/00* (2006.01)

(52) U.S. Cl. ........................................ 382/110; 452/157
(58) Field of Classification Search ................... 382/110
See application file for complete search history.

(56) References Cited

U.S. PATENT DOCUMENTS

| | | | | |
|---|---|---|---|---|
| 4,785,817 A * | 11/1988 | Stouffer | ........................ | 600/443 |
| 5,353,796 A * | 10/1994 | Schroeder et al. | ............ | 600/437 |
| 5,668,634 A * | 9/1997 | Newman | ......................... | 356/445 |
| 5,705,749 A * | 1/1998 | Manns et al. | .................... | 73/602 |
| 5,944,598 A * | 8/1999 | Tong et al. | ..................... | 452/158 |
| 5,960,105 A * | 9/1999 | Brethour | ......................... | 382/141 |
| 6,084,407 A * | 7/2000 | Ellis | ............................... | 324/300 |
| 6,170,335 B1* | 1/2001 | Clinton | ........................... | 73/629 |
| 6,198,834 B1* | 3/2001 | Belk et al. | ...................... | 382/110 |

(Continued)

FOREIGN PATENT DOCUMENTS

CA         2 371 911         2/2001

(Continued)

*Primary Examiner* — David P Rashid
(74) *Attorney, Agent, or Firm* — Michael J. Striker

(57) ABSTRACT

A non-invasive method is described for identifying contours with complex structures having an error recognition rate tending towards zero, which method can be used to distinguish and identify features of a slaughtered animal body with respect to each other, said method being utilized on the basis of a characteristic piece in particular to determine, by means of image processing, data for calculating the muscle-meat percentage, the trade classification and the associated trade value and market value, and also to rate the quality of slaughtered animal bodies, taking into account legal requirements.

In accordance with the invention, during error recognition of contours of a slaughtered animal body which have complex structures and which are to be distinguished and identified with respect to each other, an operator at a workstation in the form of a PC interacts with the computer and provides sufficient indications relating to the unidentified or incorrectly identified contour to be sought, in that by employing an image reproduction device at least one support point is in each case set in the illustration of an image of the region of interest of the slaughtered animal body in one or several regions, in which data is to be determined from measurements.

11 Claims, 3 Drawing Sheets

U.S. PATENT DOCUMENTS

| | | | |
|---|---|---|---|
| 6,615,661 B2 * | 9/2003 | King | 73/602 |
| 6,735,326 B1 * | 5/2004 | Schimitzek | 382/110 |
| 2004/0023612 A1 * | 2/2004 | Kriesel | 452/157 |

FOREIGN PATENT DOCUMENTS

| | | |
|---|---|---|
| CA | 2 544 712 | 6/2005 |
| DE | 41 09 345 | 9/1991 |
| DE | 298 310 | 2/1992 |
| DE | 41 31 556 | 4/1992 |
| DE | 197 33 216 | 12/1998 |
| DE | 198 47 232 | 12/1999 |
| DE | 199 36 032 | 7/2000 |
| DE | 199 52 628 | 5/2001 |
| DE | 100 50 836 | 6/2002 |
| DE | 103 58 487 | 5/2005 |
| GB | 2 371 737 | 8/2002 |
| WO | 01/22081 | 3/2001 |

* cited by examiner

DATA ACQUISITION FOR CLASSIFYING SLAUGHTERED ANIMAL BODIES AND FOR THEIR QUALITATIVE AND QUANTITATIVE DETERMINATION

CROSS-REFERENCE TO RELATED APPLICATION

The invention described and claimed hereinbelow is also described in German Patent Application DE 10 2004 055 351.3, filed on Nov. 17, 2004. This German Patent Application, whose subject matter is incorporated herein by reference, provides the basis for a claim of priority of invention under 35 U.S.C. 119(a)-(d).

BACKGROUND OF THE INVENTION

A series of automatic processes is known from the prior art for determining data of a slaughtered animal body in its splitting plane along the backbone by means of optical image processing for subsequent classification and quality rating.

Therefore, the documents DD 298 310 A5/DE 41 31 556 C2 and DE 41 09 345 C2 describe methods for determining or analysing halves of slaughtered animals by means of image processing, wherein the outer contour, layer of fat, meat and back fat ratio are determined, in that images are recorded of the entire half of slaughtered animals including the backbone and all the intermediate vertebrae layers. As a fixed point for determining the parameters for splitting and classifying the slaughtered animal body, the starting point is the sacrum of the spinal column, which is also determined in the same way as the other vertebrae by means of object analysis, wherein during the actual processing it is not always possible to select the contours required for analysis in a sufficiently reliable manner.

The document DE 197 33 216 C1 describes a method for evaluating halves of slaughtered animals using optical image processing, which renders it possible based on the standard two-point method to carry out a classification using an optical image evaluation of the extended loin region whilst excluding subjective error sources.

A method of evaluating slaughtered animal halves by means of optical image processing is also known from the document DE 198 47 232 C2, wherein a photogrammetric method is used as a simulation of the conventional two-point method. In the loin and ham region, two clearly defined points, of which the first point is the body-side end of the pin bone, the second point is the body-side end of the MGM (Musculus Glutaeus Medius), and a straight line with the direction of the middle progression of the back fat are recorded photogrammetrically. For actual evaluation purposes, the lengths of partial sections are used which are provided on a perpendicular on the straight line, which is displaced in parallel with the pin bone, at the level of the second clearly defined point through the layer of the back fat. Although in the case of this method the subjective measuring errors of the manually performed two-point method are eradicated, it is a prerequisite that the required contours and structures are reliably recognised by the optical image processing.

A further method is known from document DE 199 36 032 C1 wherein it is ensured that the quality of halves of slaughtered animals, in particular of slaughtered pigs, is automatically assessed using optical image processing and with respect to the known methods a greater level of reproducible estimating accuracy is achieved which can only be influenced insignificantly by errors during the method of splitting the slaughtered animal and cannot be influenced by imaging which is not absolutely perpendicular to the splitting plane, wherein an optical image of the slaughtered animal half in the splitting plane is evaluated in the area of the ham region and loin region photogrammetrically on the basis of specific clearly defined reference points.

The spinal column, the pin bone, the thinnest layer of fat at the MGM and the contours of the back fat in the selected region are used as the clearly defined reference points. The muscle-meat percentage which is decisive for assessing the quality is calculated by the summation of part lengths, which are set in ratio with respect to each other and are perpendicular to the straight progression of the canal of the spinal cord in the region of the meat and layer of fat using constants, which are ascertained by means of regression calculations for each term, and a basic constant. Although within the scope of the method the measurement value for the amount of fat (S) is determined in accordance with the legal regulations at correct points, the amount of meat (F) is not determined, as a result of which the muscle-meat percentage (MF %) is not calculated using the official formula, thus classification into the trade classes is not possible.

A method of determining the trade value of the pieces of pig carcasses is known from the document DE 199 52 628 A1, wherein weights, weight and meat percentages of pieces of ham, cutlet, removed cutlet, fillet, shoulder, shoulder area, belly and/or other pieces which can be traded or further processed separately are determined by means of online-evaluation of pig halves. In order to implement the method, predictors which describe the body structure are determined, which predictors result from the progression of the outer contour of the pig half and, derived therefrom, the area, position and the progression of the spinal column and, derived therefrom, the lengths and areas of part regions of the slaughtered animal body and one obtained for the pig halves, information regarding the amount of fat and representing the relative thickness and the progression of the approximate total subcutaneous fat layer of the back region. The predictors are set in relation to each other taking into consideration statistical relationships existing between them, as a consequence of which the weight of pieces which are of interest, their weight percentage and meat percentages of the total weight of the carcass are to be determined online in the slaughter line. During the course of the method the complete pig half must be recorded by video and the image object processed and evaluated, which is costly, in order to determine merely the trade value. Owing to the large image region over the entire splitting plane, the rate of evaluation is impaired and also the weights of pieces cannot be determined in a sufficiently accurate manner, and error recognition of contours and structures in the image region result in unrealistic values.

Furthermore, the patent application referenced as DE 103 58 487.0 describes a method of determining the quality and quantities of a slaughtered animal body which can be used to determine the trade classification, trade value, market value and quality and which satisfies the conditions of the relevant official directives and regulations. The result data of weight percentages from yields of the individual parts as acquired by tests on cut pieces of a sufficient number of carcasses are correlated together with the characteristic measurement values and parameters, including the total weight, which are determined by both halves of a carcass in the ham and loin region, and from this relational data is acquired and in the operating slaughterhouse a simulation calculation for estimating the yields of the individual parts is performed with this relational data taking into account the total weight of two associated halves of a carcass and the characteristic measurement values and parameters which are determined therefor specifically in the ham and loin region.

In one variation, the yields of the individual parts are estimated only on the basis of the characteristic measurement values and parameters which are determined specifically in the ham and loin region.

A common aspect of all of these known methods is that the fully automatic contour recognition algorithms which are used in image processing for identifying contours with complex structures inevitably have a certain error recognition rate. In fact, in the case of incorrectly identified contours a subsequent optimisation method can be employed when attempting to correct the errors which have occurred, wherein however, new evaluation errors generally occur with the newly determined contours, thus causing incorrect or erroneous data or values for subsequent calculations.

SUMMARY OF THE INVENTION

The object of the invention is to develop a non-invasive method of identifying contours with complex structures having an error recognition rate tending towards zero, which method can be used to distinguish and identify features of a slaughtered animal body, said method operating on the basis of a characteristic piece in particular to determine, by means of image processing, data for calculating the muscle-meat percentage, the trade classification and the associated trade value and market value, and also to rate the quality of slaughtered animal bodies, taking into consideration legal requirements or specific regulations.

The object is achieved by the features stated in claim 1. Preferred developments are described in the subordinate claims.

The basic idea behind the invention resides in the fact that during error recognition of contours of slaughtered animal bodies with complex structures which are to be distinguished and identified, by reason of significant impurities in the image region or physiological characteristics, like a poorly recognizable facie of muscles, adhesions or weak muscles by means of an automatic method which is used in slaughterhouses and meat processing works for the evaluation of slaughtered animal bodies by means of image processing, an operator at a corresponding workstation in the form of a personal computer (PC) interacts with the computer and provides sufficient indications of the unidentified or incorrectly identified contour to be sought.

These indications allow a newly sequencing contour recognition algorithm to reliably detect the contour to be sought. In particular, the operator can input the indications graphically with the aid of an image reproduction device into the illustration of an image of the region of interest of the slaughtered animal body, alternatively this can be done audiovisually or in text form.

In the image region, the operator sets at least one support point in one or several regions, in which the measurements are to be taken. These support points as geometric set points can denote the starting point, the end point, the midpoint or any point of the contour which is to be found. Alternatively, the support point can also mark a permissible or forbidden region for the contour. In the case of more than one support point, it is possible in addition to determine higher order tensor set points, such as vector set points from two support points and curvature set points from three support points.

Furthermore, it is possible to acquire starting parameters for the contour recognition algorithm from the analysis of the area surrounding the support point. These parameters can be provided e.g. in the form of minimum or maximum or average luminances, chrominances and contrasts. However, it is also possible to determine more complex features like textures as parameters.

Subsequently, characteristic measurement values and parameters, such as sections, angles and areas and also the brightness and colour information included in the image, preferably in the loin and ham region are determined in a conventional manner with reference to selected, clearly defined points and structures in the image region.

For example, in the case of slaughtered pigs, the two-point method applicable throughout Europe is used to determine exact measurement values for the amount of fat (S) and the amount of meat (F), from which using the official formula the muscle-meat percentage (MF %) is directly calculated and the slaughtered pigs are thus classified into the trade class.

The cutlets can be evaluated on the basis of the determined lengths of perpendicular partial sections in the region of the straight portion of the spinal column in the imaging region with respect to the outer contour and the fat progression and their relationship to each other.

An estimation of the yield of individual parts is provided by further characteristic values in conjunction with the results of tests on cut pieces. The piece evaluation which can be carried out thereby produces as usual the trade value. The weight of the carcass forms the basis for estimating the weights of the pieces and from their total in turn the market value is determined.

The quality of the carcass is rated by the brightness and colour information ascertained.

The advantages of the invention reside particularly in the error recognition rate which is reduced to virtually zero in the evaluation of quality and quantity of a slaughtered animal body and associated positive economic effects for the meat producer and processor.

A comprehensive evaluation and classification of a slaughtered animal body and pieces thereof is made possible.

An implementation of the interaction is possible in the case of all of the non-invasive automatic methods which include a pictorial representation of a region which has contours and structures to be identified and in which measurement values are to be determined.

BRIEF DESCRIPTION OF THE DRAWINGS

The invention will be explained in detail hereinunder as an exemplified embodiment with reference to the drawings, in which.

DESCRIPTION OF THE PREFERRED EMBODIMENTS

A specific method of classifying pig carcasses, the so-called two-point method, starts by identifying the Musculus Glutaeus Medius and the vertebral line.

Subsequently, the amount of fat (S), as the thinnest point of the fat (including the rind), is first determined over the Musculus Glutaeus Medius (in millimeters) and followed by the amount of meat (F) as the shortest connection of the front, cranial end of the Musculus Glutaeus Medius to the upper, dorsal edge of the vertebral canal (in millimeters).

The amount of fat and the amount of meat which are determined in this manner then provides in accordance with Appendix 4 of the trade classification regulations (HKL-VO) the muscle-meat percentage of the pig carcass. According to Appendix 1 of the HKL-VO, the allocation of the trade class is then carried out.

The classification of the pig carcasses is performed using an approved classification device which consists substantially of an image recording device and a computer workstation incorporating corresponding software and operated by neutral classifiers. In general, these classifiers are sworn experts who are able to evaluate very accurately the fat, meat and vertebral contours of a slaughtered animal body.

The correct evaluation and classification of the slaughtered animal body thus remains the responsibility of the classifier.

At the beginning of the procedure, an imaging process is employed in a known manner to take a digital image of the loin and ham region of a slaughtered animal body which has been split along the spinal column, the image is subjected to image analysis, in which contour bone are recorded. By means of the contour progressions, individual sections and areas and sections averaged over contour regions are measured and brightness values and/or colour values are acquired.

The characteristic measurement values and parameters in the loin and ham region are acquired e.g. in dependence upon the method described in the document DE 199 36 032 C1 or patent application DE 103 58 487.0.

Figure 1:
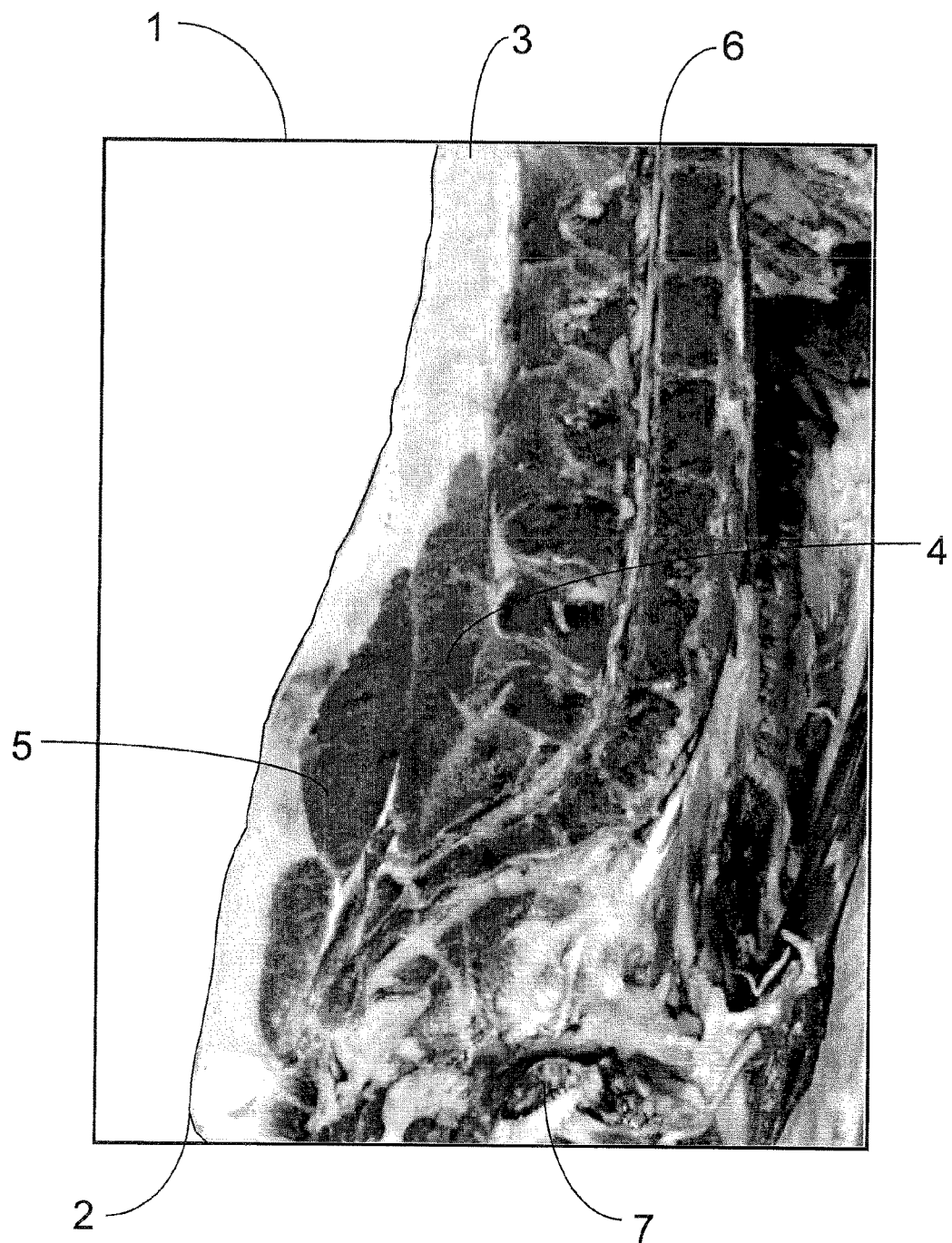
FIG. 1 shows an image of one half of a slaughtered animal body in the loin and ham region with unclear contours.

As shown in FIG. 1, an image region 1 of the ham and loin region of half of a pig carcass together with all details is recorded and is subsequently evaluated photogrammetrically.

The image region 1 records in contrast to a dark background the entire width of the extended ham and loin region with its outer contour 2.

Using a histogram analysis the threshold parameters are first renormalised in the usual manner to the respective average brightness of the pig carcass with subsequent computerised selection of the different tissue sections on the basis of colour and/or brightness differences in the image region 1. Impurities caused by blood are substantially filtered out of the image with the aid of self-checks for consistency.

In the next step, the light-coloured fat is separated from the darker meat and in this manner fat areas 3 and meat areas 4 are determined.

Within the meat areas 4, amongst other things the contour of a Musculus Glutaeus Medius (MGM) 5 is to be identified using a contour-tracking algorithm with subsequent determination of the geometric position.

As shown in FIG. 1, a) the contour of the MGM 5 is not clearly demarcated by reason of individual physiological features in the meat area 4, wherein the causes for this can be e.g. adhesions or small formation of the facie of the MGM 5;
b) a vertebral canal 6 is not clearly identifiable, as it was not struck in the middle in the splitting process or is bloody, and
c) a pin bone 7 cannot be reliably identified owing to partial concealment by fat tissue or blood.

Figure 2:
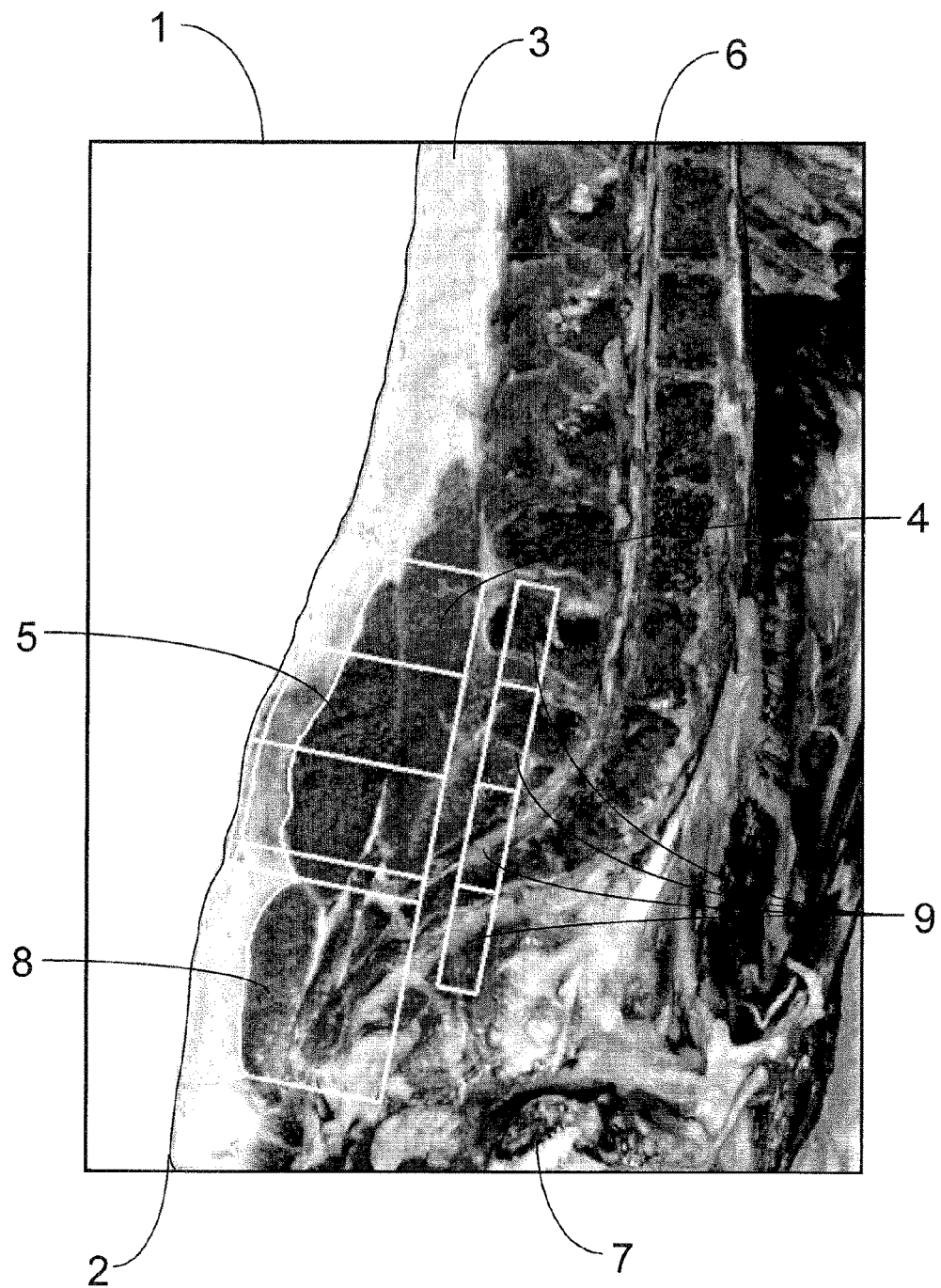
FIG. 2 shows an image of one half of a slaughtered animal body in the loin and ham region with an illustration of error recognition of characteristic measurement values and parameters.

The contour analysis performed in an image of this type, as illustrated in FIG. 2, inevitably has error recognitions which the classifier identifies and/or which are output by the computer as an error message in the form of a warning or alarm indication.

In the selected image, a meat area 8 which is similar to the MGM 5 is identified as MGM 5 by the automatic image analysis and vertebrae 9 in the dorsal region of the spinal column are incorrectly allocated and the pin bone 7 is also not found.

If the measurement values and parameters for evaluation of the slaughtered animal were determined on the basis of the result of this analysis, absolutely incorrect evaluations would be produced as a result.

The error recognition is identified by the classifier, it is indicated or reported to him. In the image region 1, the classifier as the operator then sets at least one support point in one or several regions, in which the measurements are to be taken. These support points as geometric set points can denote the starting point, the end point, the midpoint or any point of the contour which is to be found.

In this case, it is generally, adequate to mark support points only in the region of the unidentified structure, such as the MGM 5 and/or the vertebrae 9 and/or the pin bone 7.

Figure 3:
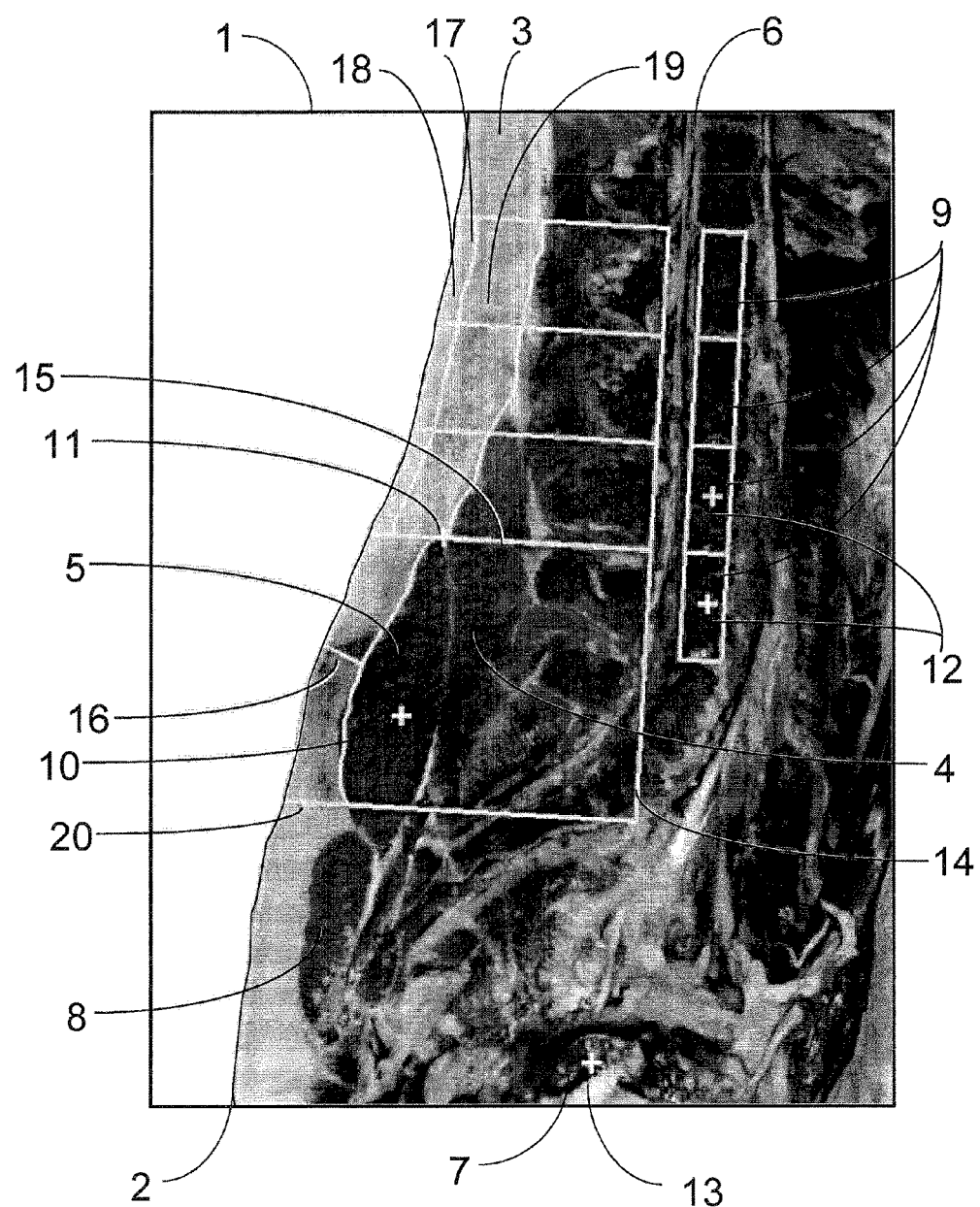
FIG. 3 shows an image of one half of a slaughtered animal body in the loin and ham region with an illustration of support points as markings and the characteristic measurement values and parameters determined therewith.

In this example, as shown in FIG. 3:
a) in order to correctly identify the contour of the MGM 5, a first support point 10 is set in the MGM 5 to find brightness information and a second support point 11 is set on the cranial end of the MGM 5 as positional information;
b) in order to help find the vertebral canal 6, preferably two adjacent vertebrae 9 are each marked with a further support point 12, wherein additional directional information is determined, and
c) in order to identify and recognise the contours of the pin bone 7, an additional support point 13 is set in the cranial end region thereof.

In accordance with the contour analysis which is carried out once again with the aid of the set support points, a) the Musculus Glutaeus Medius (MGM) 5 and its geometric position are clearly identified as illustrated in FIG. 3.

Also, b) the contour of the lower end of the spinal column, as visible in the image region 1, comprising vertebrae 9 and the vertebral canal 6 has been precisely identified. The same statement applies c) to the pin bone 7 which has been clearly identified and whose contour has been determined.

In the case of specific populations of slaughtered animals, in which in particular the MGM 5 as an essential element for determining data and measurement values in the image region is very weakly formed, whereby automatic processes by means of image analysis lead predominantly to error recognitions of the contours and structures, it is practical as an alternative to mark support points prior to commencement of the image analysis.

In the image region 1, the first support point 10 is optionally set in the MGM 5 to find brightness information and/or the second point 11 is set on the cranial end of the MGM 5 as positional information, and optionally in order to reliably find the vertebral canal 6 preferably two adjacent vertebrae 9 are each marked with a further support point 12 and the pin bone 7 is also optionally marked with the additional support point 13 and only after this is the image analysis for identifying contours and structures started which is followed in a known manner by the determination of measurement values and data in the image region.

As usual, a straight line 14 with the direction of the straight section of the spinal column is set as the starting line for subsequent measurements at the upper (dorsal) edge of the vertebral canal 6. A perpendicular 15 is then created on this straight line 14 at the height of the front (cranial) end of the MGM 5, the section length of said perpendicular as the shortest connection from the front end of the MGM 5 to the upper (dorsal) edge of the vertebral canal 6 corresponds to the amount of meat (F) as the thickness of the loin muscle. The extension of the perpendicular 15 as far as to the outer contour 2 defines the progression of fat over the MGM 5 cranial.

At the height of the thinnest fat layer on the MGM 5, a connection line 16 is determined from the contour of the MGM 5 to the outer contour 2, of which the section length represents the amount of fat (S).

From the two terms (F) and (S) which are measured in millimeters, the calculation of the muscle-meat percentage (MF %) is calculated online with the official formula from the two-point method specific for the individual country with the subsequent trade class classification on the basis of the determined muscle-meat percentage.

A number of further sections, angles and areas which can be determined in the image region 1 are used to provide advanced statements relating to the slaughtered animal body analysed in each case.

For example, fat, meat and bone measurements can be taken in the region of the spinal column and of the pin bone 7.

As a further important feature, it is possible to determine the histological division of the fat by means of a connective tissue-like septum 17 into an upper fat layer 18 and a lower fat layer 19. The upper fat layer 18 is defined as the lower rind fat and the lower fat layer 19 is defined as the body fat layer.

Statements relating to the muscle-meat percentage of the belly can be derived from the thickness of the lower rind fat.

Precise statements relating to the cutlets can preferably be acquired from sections and areas above the vertebrae 9. Furthermore, in order to evaluate the ham, it is also possible to incorporate the average fat thickness over the MGM 5 in the region of the area between the extension of the perpendicular 15 up to the outer contour 2 and another perpendicular 20 on the straight line 14 which is also involved in determining the trade value.

The percentage of pieces, such as the ham or the cutlets, with respect to the entire body of the slaughtered animal can be determined directly from the data of the measurement values of the image analysis, in the same way as percentage of the muscle meat of the respective piece.

In turn, in more advanced calculations e.g. the percentage of the muscle meat of the ham without bones and fat can be determined.

By incorporating the total weight of the two associated halves suspended on the hook which is recorded after removal of the slaughtered animal body, it is also possible to calculate the yield of individual parts, with which the trade value is calculated from the sum of the evaluations of pieces and the market value is calculated from the sum of the weights of the pieces.

Then, with reference to the percentages determined, the weight declarations for the relevant parts such as the ham, cutlet and other valuable pieces can be calculated based on total weight.

The quality of the carcass and/or of pieces is rated with reference to the present further characteristic image information in the form of brightness values and/or colour values.

LIST OF REFERENCE NUMERALS USED

1 image region
2 outer contour
3 fat areas
4 meat areas
5 Musculus Glutaeus Medius (MGM)
6 vertebral canal
7 pin bone
8 similar meat area
9 vertebrae
10 first support point
11 second support point
12 further support point
13 additional support point
14 straight line
15 perpendicular
16 connection line
17 septum
18 upper fat layer
19 lower fat layer
20 other perpendicular

What is claimed is:

1. A non-invasive method of identifying contours with complex structures having an error recognition rate tending towards zero, comprising the steps of:
    distinguishing and identifying contours of a slaughtered animal body;
    utilizing, on a basis of a characteristic piece of said slaughtered animal body by means of image processing, measurement values of individual sections, partial sections, averaged sections and areas with a reference to progression of said contours for calculating a muscle-meat percentage, a trade classification and an associated trade value and a market value;
    rating a quality of slaughtered animal bodies with further characteristic image information, wherein during error recognition of said contours of said slaughtered animal body, said contours having complex structures to be distinguished and identified, an operator at a workstation comprising a personal computer utilizes the personal computer to provide indications relating to an unidentified or incorrectly identified contour to be sought and;
    employing an image reproduction device to set at least one support point, in each case, set in an illustration of an image of a region of interest of said slaughtered animal body containing one or more regions,
    wherein data identifying said contours is to be determined from measurements.

2. Method as claimed in claim 1, characterized in that the support points as geometric set points denote the starting point, the end point or any point within a contour to be identified.

3. Method as claimed in claim 1, characterized in that a first support point (10) is set in the Musculus Glutaeus Medius (MGM) (5) in order to find brightness information, or a second support point (11) is set on a cranial end of the Musculus Glutaeus Medius (MGM) (5) as positional information, or both.

4. Method as claimed in claim 1, characterized in that in order to reliably find a vertebral canal (6) preferably two adjacent vertebrae (9) are marked in each case with a further support point (12).

5. Method as claimed in claim 1, characterized in that a pin bone (7) is marked with an additional support point (13).

6. Method as claimed in claim 1, characterized in that the support points denote a region that is outside of a contour which is to be identified.

7. Method as claimed in claim 1, characterized in that starting parameters for a contour recognition algorithm are acquired from the analysis of the area surrounding the support point.

8. Method as claimed in claim 7, characterized in that minimum, maximum or average luminances, chrominances and contrasts are utilized as the starting parameters.

9. Method as claimed in claim 7, characterized in that complex features like textures are determined as starting parameters.

10. Method as claimed in claim 1, characterized in that for a specification of more than one support point for a contour which is to be identified, higher order tensor set points are additionally determined, such as vector set points from two support points and curvature set points from three support points.

11. Method as claimed in claim 1, characterized in that a percentage of pieces of the slaughtered animal body are determined directly from the data of the measurement values of the image analysis.

* * * * *